E. B. CAMPBELL.
PACKING RING.
APPLICATION FILED OCT. 28, 1914.
1,136,506. Patented Apr. 20, 1915.
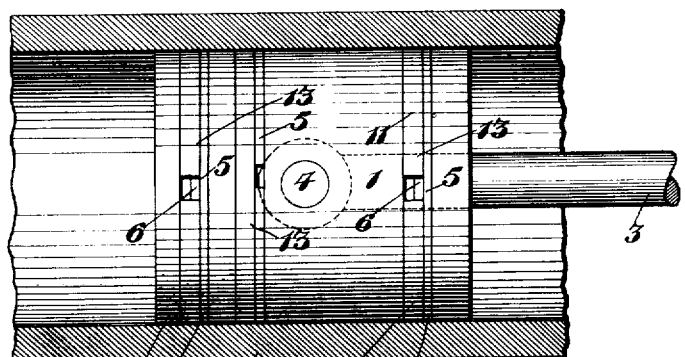
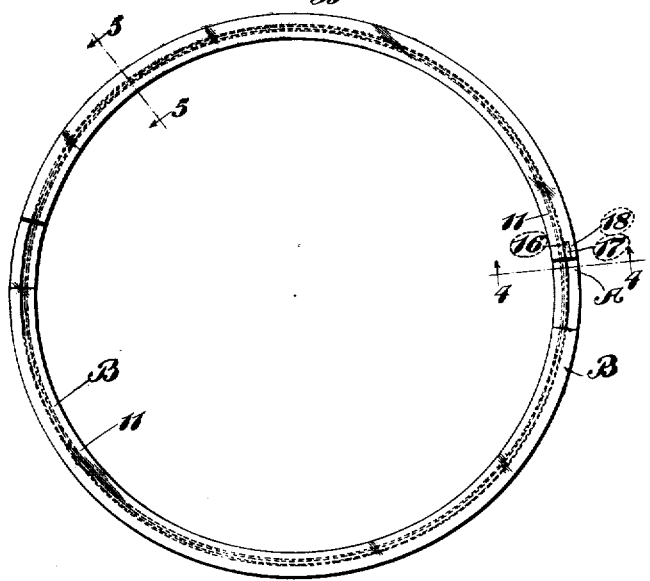
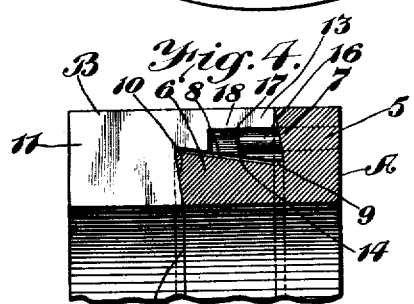
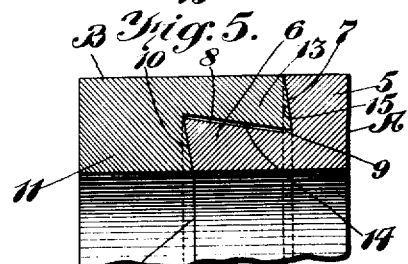
Attest:
Charles A. Becker
R. M. Lawrence
Inventor.
Edward B. Campbell,
by Rippey & Kingsland
His Attys.

UNITED STATES PATENT OFFICE.

EDWARD B. CAMPBELL, OF ST. LOUIS, MISSOURI, ASSIGNOR TO McQUAY-NORRIS MANUFACTURING COMPANY, OF ST. LOUIS, MISSOURI, A CORPORATION OF MISSOURI.

PACKING-RING.

1,136,506.   Specification of Letters Patent.   Patented Apr. 20, 1915.

Application filed October 28, 1914. Serial No. 868,951.

*To all whom it may concern:*

Be it known that I, EDWARD B. CAMPBELL, a citizen of the United States, residing in the city of St. Louis and State of Missouri, have invented a new and useful Packing-Ring, of which the following is a specification.

This invention relates to packing rings for reciprocating pistons, and it consists of two resilient open rings provided with novel structural features for preventing fouling of the ends of the rings with the ports of the cylinder, and it also consists of other novel features and improvements, all of which are hereinafter made apparent.

An object of the invention is to provide an improved packing ring consisting essentially of two overlapping rings of the open resilient type, having abutting oblique walls by which the expansion of either ring is exerted upon the other throughout the circumference of both of said rings, thus imparting a uniform outward pressure and maintaining the rings in close contact with the interior of the cylinder.

Another object is to provide an improved packing ring comprising two overlapping resilient open rings having abutting oblique walls whereby the ends of each ring are held in the same arcuate plane with the periphery of the adjacent ring, thus preventing the ends of said rings from becoming fouled with the cylinder ports, and constituting means whereby the outward pressure or expansion of each ring is exerted upon the other ring and so keeping both rings in close contact with the interior of the cylinder.

Another object of the invention is to provide a packing comprising two overlapping resilient open rings having abutting oblique walls, with means carried by one of said rings with an abutment carried by one of said rings for limiting the relative movement of said rings with respect to each other, the said abutment being so arranged that it is locked against displacement in either direction when the rings are upon the piston.

A further object is to provide an improved packing comprising two overlapping resilient open rings for abutting oblique walls, and a passage between the overlapping portions of said rings adapted to receive and convey lubricant between the rings so that the full expansive force of each ring will be exerted against the other rings, thus pressing both rings with their combined expansive pressure against the interior of the cylinder.

Other objects to be attained by this invention will be understood without specific mention, and in mentioning the foregoing objects and advantages I do not deprive myself of the benefit of all of the advantages of the invention.

In the accompanying drawings, wherein I have illustrated a preferred embodiment of the invention, Figure 1 is a sectional view of a cylinder having a reciprocating piston mounted therein, and illustrating my improved packing mounted on said piston. Fig. 2 is an elevation of the packing comprising the two overlapping rings, before being placed upon the piston. Fig. 3 is a side elevation of the packing before being applied to the piston. Fig. 4 is an enlarged sectional view taken approximately on the line 4—4 of Fig. 2. Fig. 5 is a sectional view on the scale of Fig. 4 and taken on a line such as 5—5 of Fig. 2.

The piston 1 is of the usual reciprocating type, and operates within a cylinder 2 and is provided with a piston rod 3 pivotally connected to the piston at 4, whereby the power of the piston is transmitted to the driving mechanism.

The packing constituting the present invention is adapted to be mounted in a circumferential groove in the piston and to reciprocate therewith in the operation of the engine. It will be understood that the piston is to be equipped with a plurality of packings and, in Fig. 1, I have illustrated the piston equipped with three packing rings.

Each packing is composed of two overlapping rings which are coöperatively related and are adapted to be mounted in the same circumferential groove on the piston so that the resiliency of each ring will be exerted against the coöperating ring, thus pressing both rings against the interior of the cylinder with the full power of both rings.

In the embodiment illustrated each packing includes a ring A of the open type which is originally cut from a cylinder somewhat larger than the diameter of the ring when it has finally been seated in the groove on the piston and within the cylinder. Hence, after the packing has been mounted upon the piston it is necessary that the two component rings be slightly compressed within the groove on the piston before entering the cylinder in which the piston and packing are to be mounted. The ring A is formed to provide a part 5, the periphery of which is arranged to operate against the interior of the cylinder, and the side wall of which is arranged to press against the wall of the groove on the piston in which the ring is mounted. Said ring A is also formed to provide a part 6, said parts 5 and 6 being formed by removing a portion of the material from the ring, so that the ring thus constituted includes the integrally united parts 5 and 6. The inner wall 7 of the part 5 extends obliquely toward the outer wall of the part 5 from the periphery of the ring, as will be clearly understood by reference to Figs. 4 and 5. The outer wall 8 of the part 6 extends obliquely toward the peripheral plane of the ring, so that the portion of the parts 6 which is adjacent to the part 5 is thinner than the outer edge of said part 6. A peripheral flange 9 is formed integrally with the parts 5 and 6 adjacent to the part 5, and the outer wall 10 of the part 6 is formed oblique in a plane parallel with a plane of the oblique wall 7.

The coöperating ring B includes a part 11 which is of the same thickness as the part 5 of the ring 8, and the outer wall of which is arranged to operate against one of the walls of the groove in which the packing formed by the two rings is mounted. The part 11 of the ring B has an oblique inner wall 12 adapted to engage and cam against the oblique wall 10 when the two rings are assembled in their overlapped relation. The ring B is further provided with a portion 13 which overlaps the portion 6 of the ring A and bears upon the peripheral flange 9, thus leaving a space or passage 14 which constitutes a passage for a lubricant to prevent the two rings from sticking together, thus assuring free action of the rings. The inner wall 15 of the part 13 is oblique and is arranged to operate against the oblique wall 7 and the ring A when the two rings are assembled as a packing upon a piston.

When the two open rings are assembled as a packing upon the piston they are placed in such position that the open ends of one ring is approximately diametrically opposite from the open ends of the coöperating ring. By this arrangement the expanding power of each ring is imparted to the coöperating ring. Thus, there is a tendency by each ring to expand beyond its annular form toward a straight line, the tendency being for the open ends to move outwardly and away from each other in a direction which, if the movement were continued, would change the form of each ring into an arcuate or straight band. This tendency on the part of each ring is utilized to expand the intermediate portion of the coöperating ring, since the open ends of each of said rings are engaged against the intermediate portion of the coöperating ring. In this way both rings are retained in annular form with substantially equal pressure imparted on all radial lines against the interior surface of the cylinder. It will be understood that the open ends of the ring A will be positively retained in the same arcuate plane with the adjacent periphery of the ring B, since an intermediate portion of the ring B overlaps the ends of the part 6 of the ring A. So, also, the ends of the ring B will be permanently retained in the same arcuate plane with the periphery of the ring A, since the oblique engaging walls 10 and 12 and the oblique engaging walls 7 and 15 enable the ring A to prevent movement of the ends of the ring B beyond the periphery of said ring A. Further, the said oblique engaging walls on the two rings of each packing constitute cams by which the two rings are retained close against the opposite walls of the groove in which they are seated on the piston. The camming action is the result of the tendency of the ends of each ring to expand beyond the periphery of the adjacent ring, and such expansion obviously forces the two rings apart and against the walls of the groove in which they are mounted. This manner of engaging the ends of each ring with the intermediate portion of the adjacent ring also attains the highly important result of positively preventing the ends of either ring from becoming caught in or fouled with the ports of the cylinder across which the rings are operated.

As before stated the two rings are assembled with their ends substantially on diametrically opposite sides of the piston so that the periphery of each ring closes the space between the open ends of the adjacent ring. In order to prevent substantial relative movement of the rings with respect to each other, I provide an abutment 16 carried by one ring for limiting movement of the coöperating ring. The abutment 16 is in the form of a pin rigidly mounted in a hole in the part 5 of the ring A and extending parallel with the axis of said ring instead of in a radial direction. By this arrangement should the pin become loose it will, nevertheless, be positively prevented from displacement in one direction by the wall of the groove in the piston in which the packing is mounted, and in the other direction by the oblique wall 8 of the ring to which the pin is attached. This will be understood by reference to Fig. 4 in which it will be seen that very slight movement by the pin 16 will bring said pin into engagement with the oblique wall 8, thereby preventing further movement.

In the embodiment shown the part 13 of the ring B is provided with a notch 17 in one end adapted to receive the pin 16. The notch 17 is formed by removing a portion of the part 13 of the ring B, thus leaving a projecting part 18 extending over said pin.

It will be understood that there may be variations in the construction and arrangement of the two rings without departing from the spirit and scope of the invention. I do not restrict myself to all of the details illustrated and described except in such claims as said details are specifically set forth, but

What I claim and desire to secure by Letters Patent is—

1. A packing comprising two overlapping rings, a portion on the inner ring extending outwardly to the periphery of the outer ring at the edge of the outer ring and provided with an oblique wall on said extended portion adjacent to the edge of the outer ring, said outer ring having an oblique wall adapted to coöperate with the oblique wall adjacent thereto, and an inwardly extending portion on said outer ring at one edge of the inner ring and provided with an oblique wall, and said inner ring being also provided with an oblique wall adapted to coöperate with said oblique wall on said extended portion of the outer ring adjacent thereto.

2. A packing comprising an inner ring portion provided with an inclined peripheral wall, an outward extension on said ring portion at the thinner part thereof and provided with an oblique wall on the side adjacent to said inclined wall, an outer ring portion encircling said inner ring portion and provided with an inclined wall adapted to coöperate with the inclined wall on said inner portion and also provided with an oblique wall adapted to coöperate with the oblique wall on said outward extension, an inward extension on said outer ring portion, and provided with an oblique wall, and the edge of said inner ring portion being also provided with an oblique wall adapted to coöperate with the oblique wall on said inward extension.

3. A packing comprising a ring including an outer portion and an inner portion thinner than said outer portion, an oblique wall on the outer portion outwardly from said thinner portion, an oblique wall on the edge of said thinner portion, a second ring having an oblique wall adapted to coöperate with the oblique wall on said thinner portion of said first-named ring, a portion on said second-named ring encircling said thinner portion of said first-named ring, and an oblique wall on said second-named ring adapted to coöperate with said oblique wall on the outer portion of said first-named ring.

4. A packing, comprising two overlapping rings of the open resilient type, two oblique walls formed on each of said rings, the two oblique walls on one of said rings adapted to coöperate with the two oblique walls on the other ring, and a passage between the overlapping portions on said rings for admitting a lubricant between said rings.

5. A packing, comprising a resilient open ring including an outer portion having an oblique wall on one side, and an inner portion extending from the side of said outer portion and having an oblique wall on its edge, a second ring having an oblique wall adapted to coöperate with the oblique wall on the edge of the inner portion of said first-named ring, a portion on said second ring overlapping the inner portion on said first-named ring, an oblique wall on the operlapping portion of said second ring adapted to coöperate with the oblique wall at the side of said first-named ring, and an abutment carried by one of said rings for limiting relative movement of said rings.

6. A packing, comprising two rings of the open resilient type each having an oblique wall on one side, an inner portion integral with one of said rings having an oblique wall on its edge adapted to coöperate with the oblique wall on the side of the other ring, an overlapping portion integral with the other ring encircling said inner portion of said first-named ring and having an oblique wall adapted to coöperate with the oblique wall at the side of said first-named ring, a passage for lubricant between said two rings, and an abutment carried by one of said rings for limiting relative movement of said rings.

7. A packing, comprising two rings of the open resilient type each having an oblique wall on one side, an inner portion integral with one of said rings having an oblique wall on its edge adapted to coöperate with the oblique wall on the side of the other ring, an overlapping portion integral with the other ring encircling said inner portion of said first-named ring having an oblique wall adapted to coöperate with the oblique wall at the side of said first-named ring, a peripheral flange on said inner portion supporting said encircling portion at a sufficient distance from said inner portion to permit the passage of lubricant between said inner portion and said encircling portion, and a pin carried by one of said rings parallel with the axis thereof and prevented from displacement by one of the walls of said ring in which said pin is mounted.

In witness whereof, I have signed this specification in the presence of two subscribing witnesses.

EDWARD B. CAMPBELL.

Witnesses:
L. C. KINGSLAND,
R. M. LAWRENCE.

It is hereby certified that in Letters Patent No. 1,136,506, granted April 20, 1915, upon the application of Edward B. Campbell, of St. Louis, Missouri, for an improvement in "Packing-Rings," an error appears in the printed specification requiring correction as follows: Page 3, line 51, after the syllables "eral" strike out the comma; and that the said Letters Patent should be read with this correction therein that the same may conform to the record of the case in the Patent Office.

Signed and sealed this 15th day of June, A. D., 1915.

[SEAL.]

J. T. NEWTON,
*Acting Commissioner of Patents.*